United States Patent [19]

Kramer

[11] 4,205,354
[45] May 27, 1980

[54] MUSIC DIRECTOR SYSTEM

[76] Inventor: Justin Kramer, Los Angeles, Calif.

[21] Appl. No.: 938,814

[22] Filed: Sep. 1, 1978

Related U.S. Application Data

[63] Continuation-in-part of Ser. No. 722,737, Sep. 13, 1976, abandoned.

[51] Int. Cl.$^2$ ............................................. G11B 15/18
[52] U.S. Cl. ........................... 360/72.1; 84/DIG. 29; 360/12
[58] Field of Search ................... 360/72, 74, 12, 131; 84/461, DIG. 29

[56] References Cited

U.S. PATENT DOCUMENTS 3,812,532  5/1974  Crosser et al. ..................... 360/72

Primary Examiner—Robert S. Tupper

[57] ABSTRACT

A magnetic tape strip for the reproduction of bell sounds is set to play one or more of a multiple number of different melodies or programs wherein the programs are arranged on tape segments in parallel groups with each group separated from each adjacent group by an appropriate divider or "window". Half of the groups of programs are recorded or encoded on one end of the tape and play during tape travel in one direction and the other half recorded or encoded at the other end of the tape and play during travel in the opposite direction.

Mechanism acts to physically stop tape travel after completion of each program and when two or more programs are to be played, rewind the tape in the direction opposite the direction of travel needed to play the next selected program. In the event an end of play sensor fails to stop tape travel at the end of a program, an optical sensor will stop tape travel.

The arrangement and location of the programs on the tape is such that by a simple adjustment the same mechanism used for play can also be used to record or encode on any one or more program spaces.

8 Claims, 5 Drawing Figures

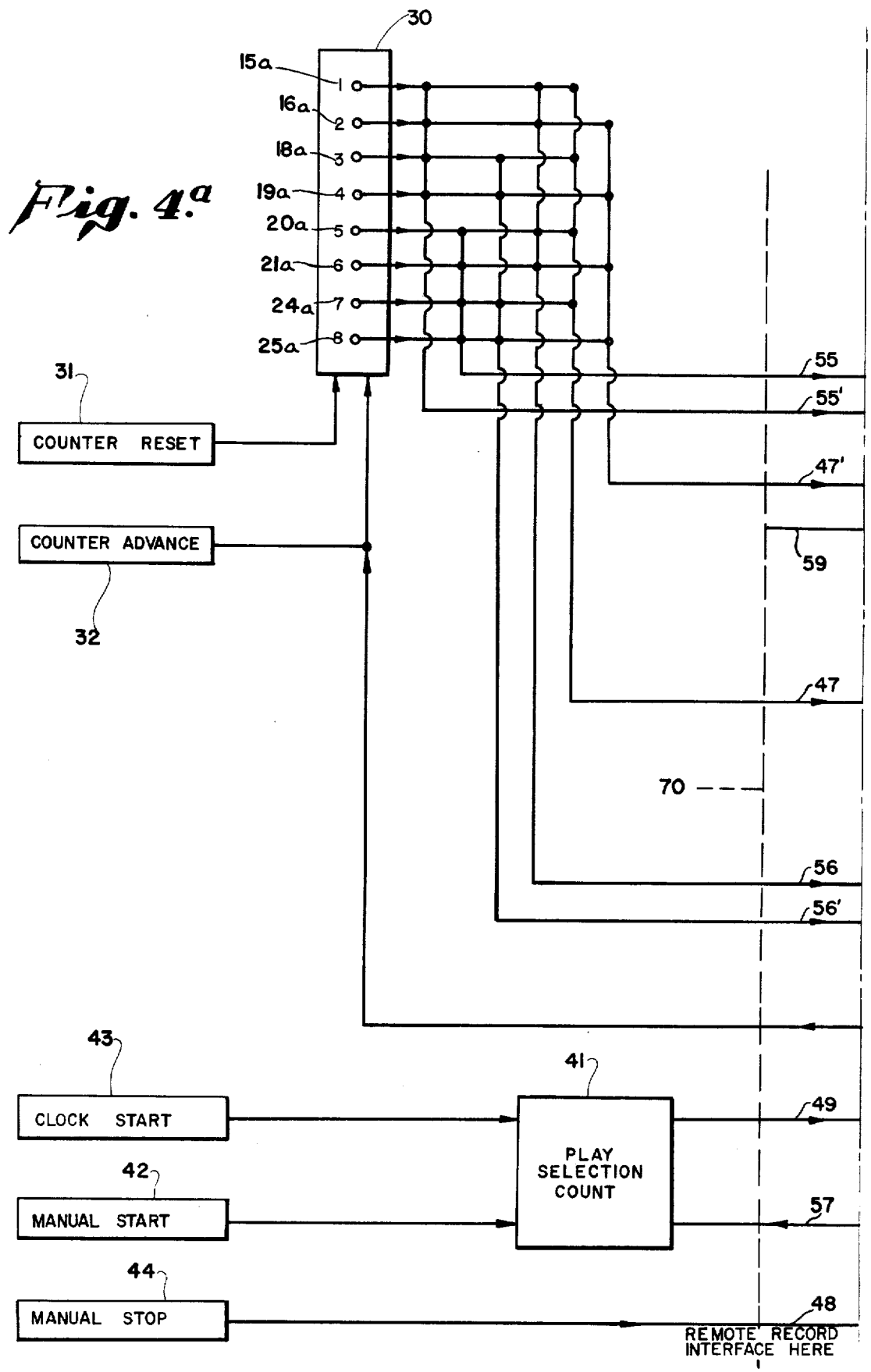
Fig. 4.a

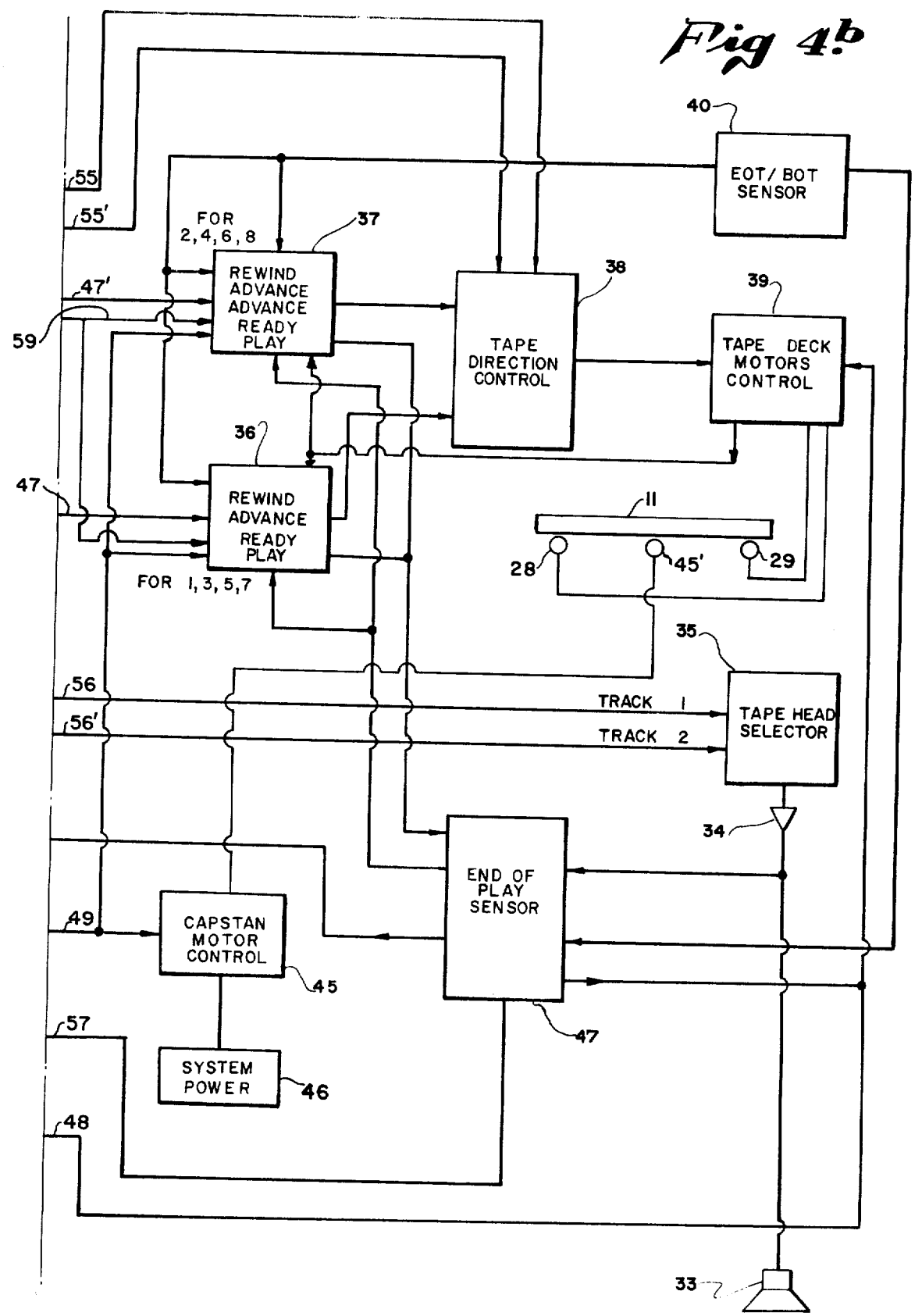
Fig 4.b

MUSIC DIRECTOR SYSTEM

This is a continuation in part of Application Ser. No. 722,737, filed Sept. 13, 1976, now abandoned.

Bell tone instruments which employ tape loop recordings for the sound source ordinarily employ a pulse to start the program cycle and foil on the tape which passes over a sensor which stops the tape at the end of the cycle. The pulse may be supplied from a program timer or from a momentary manual switch. Besides the momentary "on" switch, there is usually a momentary "off" switch which stops the tape. It should be observed that this mode of stopping a program has the disadvantage of having the tape start in the middle of a selection the next time it is started if the tape is stopped anywhere other than at the very end of a selection. A recommended solution to this problem consists of a system which would cut off the audio when the manual stop is pushed and permit the tape to recycle, i.e. to proceed until the foil sensor stops it. Here again, cutting off the audio abruptly leads to an effect that might be described as both unpleasant and unreal.

In present tape systems for bell music or programs, both those which employ recorded tape loops and those which employ cassettes, the programs are recorded sequentially. For this reason, sometimes only a single program is recorded in each loop and multiple tape decks or multitracks are employed so a reasonably quick access can be had to various programs. But as has already been noted even here, there is the disadvantage that if a tape is stopped in the middle of a program, the next time that the tape is started, it will be necessary to conclude the program during which the tape was stopped before the next program can be played. All former arrangements are cumbersome and inflexible. For example, if eight melodies, each two minutes long, were recorded sequentially on a tape loop that was stopped in the middle of a selection number two, and it was desired to play selection number one followed by selection number eight, the tape would have to play the remainder of selection number two and then selections 3–8 before arriving at selection number one, then selections numbers 2–7 before arriving at selection number eight. An operator who would know how each selection sounded could play selection number one followed by selection number eight if he would turn off the main audio during the undesired selections and listen to the entire program on a monitor system. It should be noted, however, that there would be a delay of more than twelve minutes before selection number one would begin and another delay of twelve minutes between selection number one and eight. Besides the delays there would also be the necessity of having an operator competent to monitor the tape play. In cassette systems, footage counters are sometimes used to locate positions on the tape but these require a very rigid and consistent format in programming, or the constant resetting of the counters.

It is among the objects of the invention to provide a new and improved system for playing one or more of the multiple melodies recorded or encoded on a magnetic tape wherein at the completion of each melody the sound is permitted to fade away in a realistic manner and thereafter promptly and quickly stop the mechanism so that it can be quickly reset and a second melody can be commenced.

Another object of the invention is to provide a new and improved system for playing one or more of the multiple number of bell melodies recorded or encoded on a magnetic tape wherein the shift from one melody to the next can be triggered by an electronic circuit in a quick and dependable manner and by relatively simple expedients.

Still another object of the invention is to provide an improved system for playing one or more of the multiple number of the bell melodies wherein by having the melodies on a multiple number of tracks on the tape the time for rewinding to the beginning of an operation is appreciably lessened.

Still further among the objects of the invention is to provide a new and improved system for playing one or more of a multiple number of bell melodies wherein by arranging the location of melodies on the tape at opposite ends as well as in multiple tracks and rewinding at either one end or the other, rewind time is cut down, mechanical operation is minimized and the shift from one melody to another is accomplished in a far more rapid and dependable fashion than has heretofore been available.

Another object of this invention is to provide a quick ramdom access to the selections.

Another object is to provide a system wherein the tape segments and program segments can be of varied length and where the playing mechanism will accept segments of varied length without any necessity for external adjustments.

With these and other objects in view, the invention consists of the construction, arrangement, and combination of the various parts of the device, whereby the objects contemplated are attained, as hereinafter set forth, pointed out in the appended claims and illustrated in the accompanying drawings.

Figure 3:
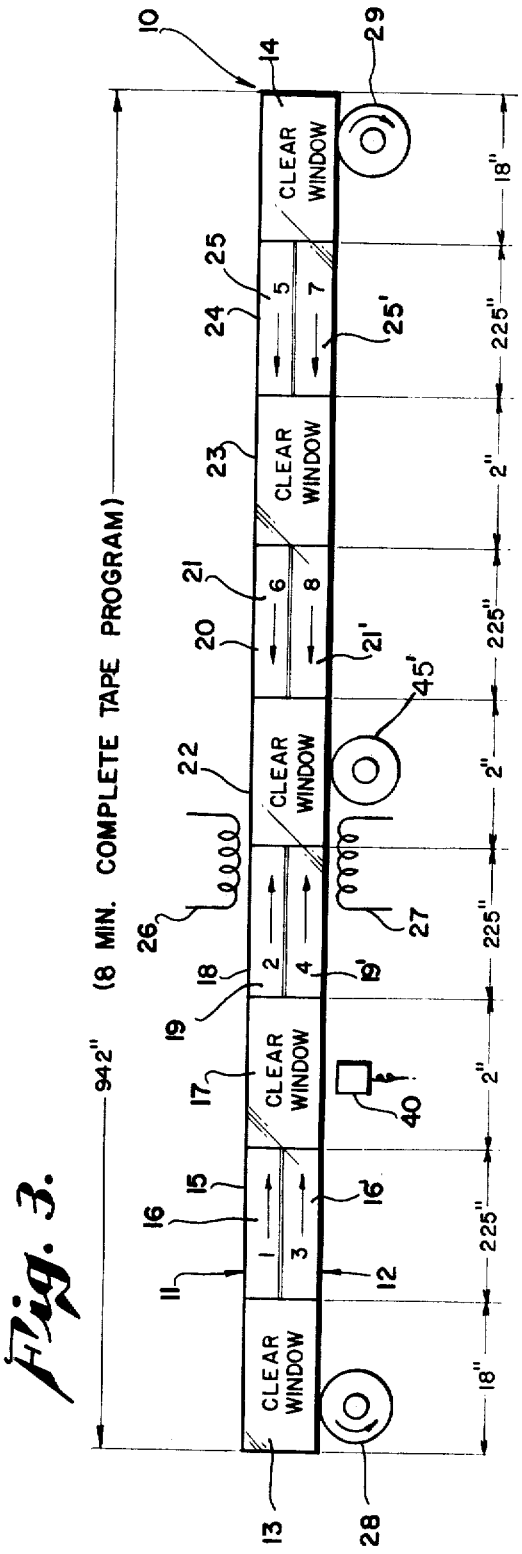
FIG. 3 is a diagram of a strip of tape, foreshortened for convenience, showing the location of a multiple number of segments each carrying a pair of melody recordings for employment of the system.

FIGS. 4a and 4b together show a block diagram of an operating circuit for making use of the arrangement of melody recordings or encoding as appearing on FIG. 3.

In an embodiment of the invention chosen for the purpose of illustration, there is shown a magnetic tape strip indicated generally by the reference character 10, as shown in FIG. 3, appreciably foreshortened for convenience in disclosure. The tape strip is one such as can be used in a cassette wherein it can be rewound in either a forward or reverse direction.

For a typical example the tape may be assumed to be one 942" long and on which there are two tracks namely, track 11 and a track 12. The description is confined to a tape of two tracks for ease in understanding although it will be appreciated that following the same principle a tape of four or more tracks could be used.

In the chosen example, there is provided a clear leader 13 at one end which can be made eighteen inches in length and at the other end a clear leader 14 of a comparable length.

Adjacent to the clear leader 13 is a tape segment 15 having two tracks 16 and 16' namely bell programs 1 and 3 respectively.

A length of 225" is shown for segment 15 which, at a travel speed of 1 7/8 ips, gives two minutes of playing time for each program.

A clear segment 2" in length follows segment 15 on which bell programs 1 and 3 have been encoded on tracks 11 and 12, separating them from the pair of bell melodies 19 and 19' for programs 2 and 4, or other program material if preferred, which has been recorded on tracks 11 and 12 of tape segment 18.

Tape segment 18 is followed by segment 20 with bell melodies 21 and 21' for programs 6 and 8 respectively, recorded on tracks 11 and 12. In the chosen example segment 18, as well as segment 20, has been shown to be 225" long. Segment 18, containing melodies 19 and 19' could be immediately adjacent to segment 20 containing melodies 21 and 21' but for ease of explanation a clear segment 22 is located between them.

The clear segment 22, as is the next clear segment 23, which is located between segments 20 containing melodies 21 and 21' and segment 24 containing melodies 25 and 25' are shown to be 2" in length. Following segment 24 is the clear leader 14 previously made reference to which extends to the end of the tape.

Although the segments carrying the melody in each case have been described as being always the same length it will be understood that the segments of successive groups can be of virtually any length either longer or shorter depending upon the particular melodies which may be desired. The clear windows also can be of varying widths and lengths.

Accompanying the tape are shown two tape heads, namely a tape head 26 for the track 11 and a tape head 27 for the track 12. At the left end there is a take up reel 28 for use when the tape is to be wound in a direction from right to left and at the other end a take up reel 29 for use when the tape is to be wound from left to right. One or more motors (not shown) but of a conventional construction and arrangement may be employed to operate the take up reels. A conventional, motor 45' operates the capstan.

Although clear segments have been made reference to as such a comparable performance can be achieved by a window such as a hole punched in the tape at the corresponding location.

In the chosen example, there are eight programs each carrying a bell melody recorded or encoded on it, all melodies preferably being different. To make use of such a tape there is provided a program selector panel 50, see FIG. 1. On the right end of the panel is a series of eight switches and indicating LED's or lights corresponding to the eight programs on the tape. The switches for convenience are labelled 15a, 16a, 18a, 19a, 20a, 21a, 24a, and 25a. As a matter of practical convenience there is a counter reset 31 and a counter advance 32 to assist in setting the indicating lights which correspond to the respective segments.

FIGS. 4a and 4b show a block diagram of the operating circuit. At the opposite end of the circuit is a loud speaker 33, powered by an amplifier 34 which receives its signal from a tape head selector 35 fed by either the tape head 26 for the track 11 or the tape head 27 for the track 12, as appears on FIG. 3.

Included in the circuit are two location units, namely, a location unit 36 for the programs 1—3—5—7 and a location unit 37 for programs 2—4—6—8. The location units are connected to the counter 30 by the leads 47 and 47'. Both units communicate with a tape deck direction control 38 which in turn communicates with a tape deck motors control 39. The tape deck motors control in turn communicates through a line 58 with the location units 36 and 37 to provide a signal to indicate when the tape has been rewound. There is also an end-of-play sensor 47 in communication with both of the location units 36 and 37. As a back up for the end of play sensor 47 there is provided an EOT/BOT sensor 40 which is an optical sensor, capable of being triggered by the clear segments or windows on the tape and the clear leaders.

A play selection count unit or counter 41 is provided, operation of which is capable of being initiated either by a manual start button 42 or a clock start station 43. This is a counter of conventional type such as might be found in a juke box. It can be assembled according to many well known methods and parts ranging from electromechanical devices to solid state integrated circuits. This counter can be pre-set to play a predetermined number of selections each time it receives a signal from the clock start 43 or manual start 42 stations. When such a signal or command is received this counter provides a signal or command to location units 36 and 37, by way of line 49. End of play sensor 47 supplies a signal to play selection count module 41 by way of line 57 each time a selection comes to its end. When this signal is received by the play selection count module 41 it either supplies a new command to location units 36 and 37 (if the number of selections for which it has been set have not yet played) or it resets itself if the selection which just played completed the number of selections in the program which it had been pre-set to play. A manual stop button 44, functioning through the lead 48, serves to cut off operation at any subsequently desired time. To complete the circuit there is shown the conventional capstan motor 45' energized by a capstan motor control 45, actuated by a lead 49 from the play selection count unit 41 and a source of power 46, which provides power for the system.

Figure 2:
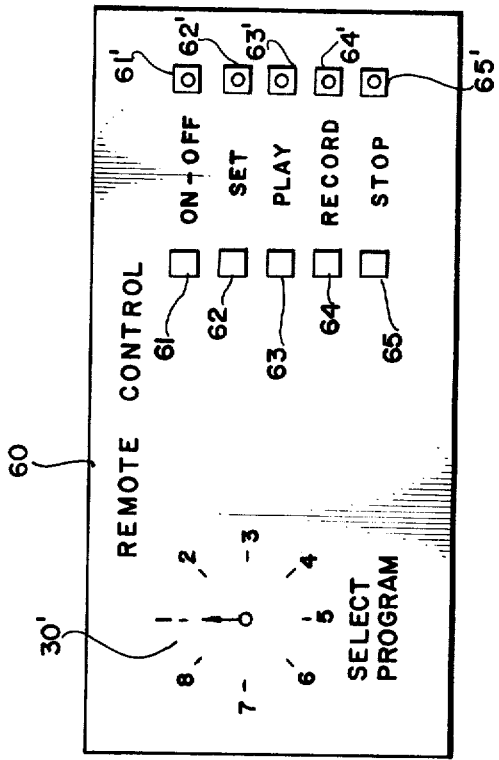
FIG. 2 is a diagram of an optional remote control panel for the system which incorporates a recording mode.
Figure 1:
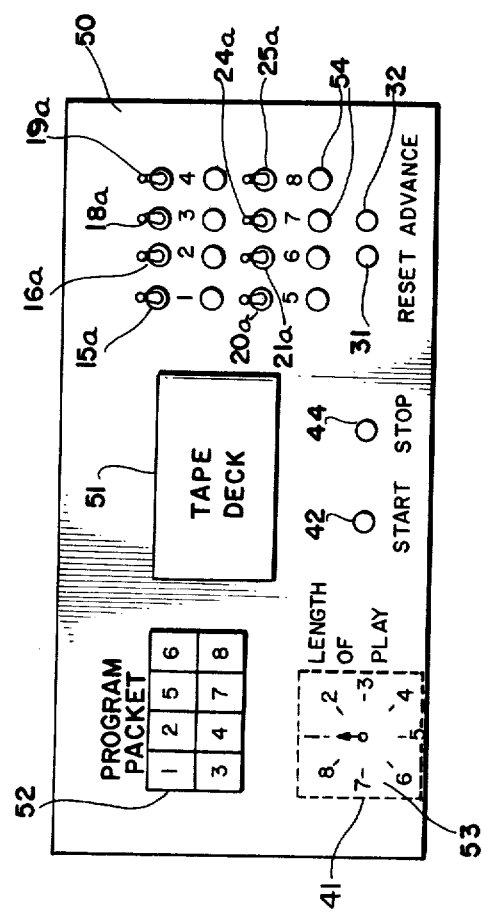
FIG. 1 is a diagram of a typical panel for operating the system.

For cooperation with the electronic circuit just described there is provided a convenient operating panel 50, FIG. 1, in which space 51 is provided for the tape deck for the tape strip 10. A program packet 52 identifies the melodies of the various eight programs, underneath which is a dial 53 for length of play corresponding to the play selection count unit 41. Lights 54 are associated with the respective switches 15a, 16a and 18a, etc.

It will be noted that there are eight switches and eight corresponding indicator lights or LED's. These are numbered on the panel 1–8, and are associated with a counter 30 shown on FIG. 4a where outputs 15b, 16b, 18b, 19b, 20b, 21b, 24b, and 25b are associated with switches 15a, 16a, 18a, 19a, etc. on the panel 50. If a switch is on the "on" position the program associated with it, as shown by the number on the panel, is affected by the counter. If the switch is on the "off" position the corresponding program will be removed from the count. In other words it will become an inactive number. The counter 30 determines which program is to be played next and after the program is to be played, advances the count to the next active program in the sequence. A lighted light over the appropriate program number provides a visual indication of the state of the counter. Two pushbuttons labeled reset 31 and advance 32 respectively provide manual control of the counter.

Each time the reset button is pushed, the count is returned to one, or the lowest active program number. Each time the advance button is pushed, the count is advanced to the next active program. This counter can be constructed according to any number of well known methods ranging from electro mechanical devices to solid state devices incorporating integrated circuit counters.

When a remote control is to be employed there is provided a remote control panel 60 on which a rotary program selector 30' is provided. For this arrangement there is an on and off control 61 with indicator light 61', a set control 62 with indicator light 62', a play control 63 with indicator light 63', a record control 64 with indicator light 64' and a stop control 65 with indicator light 65'.

Referring to FIGS. 4a and 4b, line 59 from the remote station provides a signal to location units 36 and 37 that the system is being controlled from a remote station requiring special logic.

The association of tape transports with computers and their control by computers has been a long one and at the present time microprocessors and microcomputers are being used in inexpensive consumer tape transports. Toshiba T 3444 (Electronic Design 21, Oct. 11, 1977, p. 92) makes reference to a commercially available preprogrammed model for such use.

Reference is also made to the article "Learn Microprocessor Fundamentals" of Oct. 11, 1977 edition of Electronic Design pp. 74–79 which presents fundamentals of microprocessors sufficient to fit them to the hardware called for by the Patent Application.

Typical examples of available devices are identified by catalogue number and supplier appearing in Electronic Design issue of Oct. 11, 1977 pp. 86, 88, 90, 98, 100, 102, 108, 114, 118, and 124.

A tape transport control capable of playing in either direction and currently commercially available is "Phi Deck" manufactured by Triple I Company of Oklahoma City, Okla.

"101 Easy Audio Projects" 55–56 of page 848 Guidebook for Electronic Circuits, provides an available circuit to satisfy the end of play sensor 47 of the disclosure.

Integrated circuits useable as counters are available from Texas Instruments and made reference to in the 1974 edition catalogue pp. 308, 325, 417 and 427.

A skilled programer, guided by the inventive concepts of the disclosure, and with hardware of the type made reference to can be relied upon to program the system claimed and herein disclosed.

OPERATION

To play a program three decisions must be made, (a) the direction of play, (b) the track to be read, and (c) the location of the program relative to the end of the tape.

The direction of play is determined by the tape direction control 38, energized through leads 55, 55' from the counter 30. This determines the direction of rotation of the capstan motor 45' and the direction of the fast forward and rewind modes.

The tape direction control 38 consists of a relay system or logic system which conditions the tape deck to operate either in a left to right mode or a right to left mode.

Segments 15 and 18 play right to left and segments 20 and 24 play left to right. The track to be read is determined by the tape head selector 35, energized through leads 56 and 56' from the counter 30.

In its simplest form the tape head selector 35 can be an electromechanical relay of the single pole double throw variety.

Programs 16, 19, 21 and 25 are on track 11 and programs 16', 19', 21' and 25' are on track 12.

For the location of the program relative to the end of the tape it is to be noted that programs 16, 16', 25 and 25' are located in the first group after the corresponding leader 13 or 14 as the case may be and segments 19, 19', 21 and 21' are located as two groups intermediate the clear segments or windows 17 and 23. The location and play of the segments is done by the location units 36 and 37.

These units are programming devices sometimes referred to as logic boxes which, when energized, will give a pre-determined series of commands to external devices. They may be constructed according to any well known method for such devices. These devices may be electro-mechanical or entirely electronic systems. If entirely electronic they may be made up from discrete elements or employ large scale integrated circuits such as microprocessors.

Generally speaking when the location unit 36 is energized it gives a command to rewind the tape to the physical end of the leader, the direction to be determined by tape direction control 38. The end of the tape is sensed when the rotation of the take-up reel ceases. The cessation of rotation is determined by the condition of the line 58 giving feed back from the tape deck motors control module 39. When the tape stops at the end of the reel, a command is given for "fast forward" and this continues until the end of the leader is reached, in other words until it is sensed by the EOT/BOT sensor 40. At this stage the tape is stopped and a command to "play" is given through the tape direction control module 38 to the tape deck motors control 39. As soon as the machine is engaged in the play mode a command is given to the end-of-play sensor 47. The sensor is in communication with the play selection counter unit 41 by lead 57. This will maintain the system in the play mode as long as there is program material on the tape. The circuitry here can be similar to that used in the so-called voice activated relays used in some tape recorders. In the event that the program material is digital, the play will continue until a stop command is received. In the event that the play is not stopped as described the play will be ultimately stopped by signal from the EOT/BOT sensor 40 and initiates a stop command any time that a clear section of tape or window appears through the end of play sensor 47 while the device is in the "play" mode.

When the location unit 37 is energized, it gives a command to rewind the tape to the physical end of the leader, the direction to be determined by tape direction control 38. Again the end of the tape is sensed when the rotation of the corresponding take-up reel ceases. When the tape stops at the end of the reel, a command is given to "fast forward". Fast forward continues until the end of the clear window at the end of the first segment, or group of programs is reached. This is sensed by the EOT/BOT sensor 40. At this point the tape is stopped and a command is given to the end-of-play sensor 47 which will maintain the system in the play mode as long as there is program material on the tape. Also in this instance should it be a case of digital program material play will continue until a stop command is received. In the event there is no stopping by one or the other of these means, the play will ultimately be stopped by the EOT/BOT sensor 40 which will initiate a "stop" command any time that a clear section of tape appears, while the device is in the "play" mode.

Having the foregoing explanation in mind let it be assumed that program 16 is to be played so that its melody will be heard over the louspeaker 33. To accomplish this, the rotary switch 53 is set to number one. The proper light associated with the switch for program 16, labeled 1 on the panel, is lighted by moving the switch to the "on" position and pushing reset button 31. Finally start button 42 is pushed. Pushing the start button 42 gives a signal to play selection counter 41 which passes signals to location units 36 and 37 and to the capstan motor control. It will be noted that location units 36 and 37, as well as tape direction control 38, are conditioned by signals received from the counter 30. In the present case, location unit 36 will operate in conjunction with tape direction control 38 to wind the tape from left to right on the take-up reel 29, then rapidly advance the tape in the reverse direction from right to left until the end of the clear leader and then play segment 15 whose program 16 has been selected by the tape head selector 35 which has been conditioned by the output 15b of the counter 30. As soon as play commences location unit 36 gives a signal to set the end-of-play sensor 47 which begins to monitor the program. When the end of play sensor 47 determines that the program is finished, it transmits signals to the counter 30 and play selection count 41, and to the tape deck motors control 39 to shut the tape playing system down. If the end of play sensor 47 for some reason does not sense the end of the program material, the EOT/BOT sensor 40 will provide it with a signal. Since play selection count 41 was set to play one program, the system will remain stopped and the counter will have advanced to the next active number.

In a second example let it be assumed that two programs are to play, namely programs 16 and 21. To accomplish this, the rotary switch 53 is set to number two and the switches 15a and 21a for programs 16 and 21 are placed in the "on" position with all other switches in the "off" position. Then the light for program 16 is lighted by pushing reset button 31 to return the count to one and then the start pushbutton 42 is pushed. This will result in a process as described in the first example and proceed in the same way until the end of play sensor 47 transmits signals at the end of program 16. These signals will advance the counter 30 to the number of the next selection 21 to be played and signal the play selection count 41 that the program has been completed. Since the play selection count 41 was set on two, and only one program was played, the play selection counter will give a signal to the tape location units 36 and 37 which operate in conjunction with the tape direction control 38 which in turn are conditioned by the outputs from the counter. The system will then wind the tape on spool 28 until the end of the tape then proceed rapidly to wind it on spool 29 until the beginning of segment 20 at which time it will go into the play mode and play track 11 of segment 20 i.e. program 21. When the end of play sensor 47 provides a signal to stop the system and to the play selection count 41, the system will remain stopped because the play selection count 41 will know that two selections have been played and will not initiate another play cycle.

A slightly varied procedure is necessary when the location units 36 and 37 are operated for recording instead of play. When a recording is to be made on any one of the segments it is necessary to be able to locate the beginning of the segment on the tape. In order therefore, to have a simple scheme for recording, the operator will have to do two things in sequence before the system will be in the recording mode. First be will select the program he wants by rotating switch 30' to the desired number, then he will need to press the button 62, shown on the remote control panel 60, identified as "set". Location unit 36 or location unit 37, whichever is the proper one for the segment on which the program is to be recorded, will operate exactly as in the play mode, except that instead of a command being given to play at the beginning of the segment, a light will light on the remote control panel indicating that the tape is at the beginning of the segment, in other words the beginning of the program desired, has been reached. The light will remain lighted until the operator pushes the record button 64. Conversely, if a play mode were desired the light would remain lighted until the operator should push the "play" button 63 at which time the play mode would be activated.

In the record mode the operator must stop the tape manually. If he fails to stop the tape manually the EOT/BOT sensor 40 operating through the end of play sensor 47 will stop the tape at the end of the segment, being activated by the appropriate clear segment or window. Because of this in tapes designed for field recording for example, it could be advisable to preserve the clear segment 22 or window noted as being provided between the segments 18 and 20, which in the absence of this, might be shown as programs butting each other making it impossible for the end-of-play sensor 47 to stop the operation.

A further advantage of the system herein proposed is one simplifying adoption to a remote control. A broken line 70 is shown separating one portion of the circuit from the other. This may be conveniently identified as a remote record interface. In a system where there is remote control of a record, or playback, when the remote control is turned on, the connections to the remaining or base station would be broken at the remote control interface line or broken line 70. This would insure that use of the remote control would not disturb any settings at the remaining or base station and also permit commands to come from only one station at a time. To exemplify this the operating panel 50 may be assumed to be the panel for the base station and the remote control panel 60 to be the panel at the remote station. In further explanation of operation of the program selector 30' the switch is a rotary type having 8 positions corresponding to the eight programs.

The switches shown in the right hand side of panel 50 are associated with an octal counter (not shown) namely a counter from one to eight, which advances one count each time a selection is played. It resets to count one automatically after count eight or by the counter reset button 31. The counter can also be manually advanced by operation of the counter advance 32. The LED's indicate which selection is being played, or if the tape travel is not operating, which selection will be played next. The toggle switches are for the purpose of eliminating selections from the count. In other words, if the toggle switch is in the off position the selection corresponding to that switch will be skipped over by the counter. The output of the counter is as shown in FIG. 4a.

As an additional explanation of the remote control panel 60 it is significant that the on-off control 61 with its illuminated indicator 61' will disconnect the base station from the system and connect the remote station. When the set control 62 is operated the tape travel will locate the beginning of the program or segment selected by the program select switch 30' and then stop. The illuminated indicator will light when the tape stops at the beginning of the segment and remain lighted until a second command to either play by virtue of the play control 63 or record by reason of the record control 64 being pushed. If the set control 62 has been previously pushed and the system is in the set mode, pushing the play control will complete the play cycle. If the system is not in the set mode, pushing the play button will cause the system to search and play the program selected by the program select switch and stop at the end.

The record control 64 will be effective only if the set light for the set control 62 is illuminated. Then the system will be placed in the record mode and continue in that mode until a stop command is received, either from the manual stop button 65 or the EOT/BOT sensor 40. Although the stop control 65 is shown with an illuminated indicator 65', such an illuminated indicator is superfluous. Pushing the stop control will stop the system regardless of what mode it is in.

Should the system be set for encoding digital information, and be in the record or encode mode, pushing the stop control 65 would first record a stop command and then stop the system.

The operation and electronics of a tape recording and play back system has not been shown and described as such systems are conventional and in wide commercial use.

Moreover, tape transports which are controlled by microprocessors and computers are well known. One skilled in the art can readily program an off-the-shelf microprocessor or computer to operate a bi-directional tape transport after the manner of operation just described.

Having described the invention what is claimed as new in support of Letters Patent is:

1. A system for playing one or more of a multiple number of melodies from a plurality of items of melody information recorded on a sound tape comprising a strip of tape having a plurality of tracks, each track having plurality of and segments of random length, each item being recorded on a segment of said tape wherein the length of the segment is at least as long as the length of the item, said segments being separated one from another along the tape, there being a longitudinal intermediate portion between opposite ends of the tape, said segments between said longitudinal intermediate portion of the tape and one end being adapted to play during tape travel in one direction and segments between said longitudinal intermediate portion and the other end of the tape being adapted to play during tape travel in the opposite direction, there being a clear segment of tape between each segment, and an electronic sound reproduction circuit means for reproduction of said items recorded on said tape including a loud speaker and start and stop means for energizing and de-energizing the circuit, a plurality of tape heads in operative relationship with the respective tracks, a tape head selector means for selection of one from the plurality of tape heads to be employed, segment selector means for selecting at least one segment having the melody information to be played and play selection counter means for indicating the number of said segments to be played for a given setting, tape deck motor means for driving the tape in forward and in reverse directions, and a tape direction control means for control of said tape deck motor means, said tape direction control means being responsive to the segment selector means and play selection counter means for driving the tape in either forward or reverse direction, location unit means for directing the functions of rewind, advance, and play, said location unit means being responsive to the segment selector means and play selection counter means and in operative association with said tape deck motor means and tape direction control means to successively rewind the tape to the appropriate end and then advance and play the selected segmented, there being included an end-of-play sensor means indicating the end of play of each of the items of melody information recorded on each segment, said play selection counter means being responsive to signals received from the end-of-play sensor means to stop operation of the system after playing the melody information of the last selected segment.

2. A system as in claim 1 wherein there are two tracks on the tape and the segments are arranged in pairs.

3. A system as in claim 1 wherein said end-of-play sensor means further includes an optical sensor means responsive to the clear segments of the tape.

4. A system as in claim 2 wherein there is one location unit means for the segments adapted to play during tape travel in one direction; and another location unit means for the segments adapted to play during tape travel in the opposite direction, both of said location unit means being responsive to the tape direction control, the end-of-play sensor and the segment selector and counter means.

5. A system as in claim 1 wherein there is a recording means for establishing melody information on the segments of the tape, control means for effecting energization of said recording means, and switch means acting between the recording means and the means for effecting play whereby a different melody item may be established on any of said segments.

6. A system as in claim 1 wherein said start and stop means is manually operative.

7. A system as in claim 1 wherein said start and stop means is a clock mechanism.

8. A system for playing one or more of a multiple number of melodies from a plurality of items of melody information recorded on a sound tape comprising a strip of tape, there being at least one track on the tape having a plurality of segments of random length, each item of information being recorded on a segment of said tape wherein the length of the segment is at least as long as the length of the item of information, said segments being separated one from another along the tape, there being a longitudinal intermediate portion between opposite ends of the tape, said segments between said longitudinal intermediate portion of the tape and one end being adapted to play during tape travel in one direction and segments between said longitudinal intermediate portion and the other end of the tape being adapted to play during tape travel in the opposite direction, there being a clear segment of tape between each of the segments, and an electronic sound reproduction circuit means for reproduction of said items recorded on said tape including a loud speaker and start and stop means for energizing and de-energizing the reproduction circuit means, a tape head in operative relationship with the track, segment selector means for selecting at least one segment having the melody information to be played and play selection counter means for indicating the number of said segments to be played for a given setting, tape deck motor means for driving the tape in forward and in reverse directions, and a tape direction control for control of said tape deck motor means, said tape direction control means being responsive to the segment selector means and play selection counter means for driving the tape in either forward or reverse direction, location unit means for directing the function of rewind, advance, and play, said location unit means being responsive to the segment selector means and play selection counter means and in operative association with said tape deck motor means and tape direction control means to successively rewind the tape to the appropriate end and then advance and play the selected segment, there being included an end-of-play sensor means indicating the end of play of each of the items of melody information recorded on each segment, said play selection counter means being responsive to signals received from the end-of-play sensor means to stop operation of the system after playing the item of melody information of the last selected segment.

* * * * *